United States Patent
Speer et al.

(10) Patent No.: US 9,751,512 B2
(45) Date of Patent: Sep. 5, 2017

(54) INTERNAL GEAR PUMP

(71) Applicant: Robert Bosch GmbH, Stuttgart (DE)

(72) Inventors: Harald Speer, Freiberg (DE); Rene Schepp, Waiblingen (DE); Edgar Kurz, Heilbronn-Horkheim (DE); Norbert Alaze, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/771,167

(22) PCT Filed: Jan. 27, 2014

(86) PCT No.: PCT/EP2014/051474
§ 371 (c)(1),
(2) Date: Aug. 27, 2015

(87) PCT Pub. No.: WO2014/139716
PCT Pub. Date: Sep. 18, 2014

(65) Prior Publication Data
US 2016/0009264 A1    Jan. 14, 2016

(30) Foreign Application Priority Data
Mar. 11, 2013    (DE) ........................ 10 2013 204 072

(51) Int. Cl.
*F03C 2/00*    (2006.01)
*F03C 4/00*    (2006.01)
(Continued)

(52) U.S. Cl.
CPC .............. *B60T 13/16* (2013.01); *F04C 2/086* (2013.01); *F04C 2/102* (2013.01); *F04C 2/14* (2013.01);
(Continued)

(58) Field of Classification Search
CPC .......... F04C 2/084; F04C 2/086; F04C 2/102; F04C 2/18; F04C 11/00; F04C 11/001;
(Continued)

(56) References Cited

U.S. PATENT DOCUMENTS 2,232,983 A * 2/1941 Wahlmark .............. F04C 2/101
418/170
2,311,916 A * 2/1943 Wahlmark .......... F04C 15/0049
417/303

(Continued)

FOREIGN PATENT DOCUMENTS

CN         1738972 A       2/2006
DE     196 13 833 A1      10/1997
(Continued)

OTHER PUBLICATIONS

International Search Report corresponding to PCT Application No. PCT/EP2014/051474, mailed Apr. 2, 2014 (German and English language document) (5 pages).

*Primary Examiner* — Theresa Trieu
(74) *Attorney, Agent, or Firm* — Maginot, Moore & Beck, LLP

(57) ABSTRACT

The disclosure relates to an internal gear pump as a hydraulic pump for a slip-controlled vehicle brake system. The disclosure proposes to configure the internal gear pump as a preassembled module with a cartridge as housing, which can be pressed into a receptacle of a hydraulic block of the vehicle brake system. The cartridge has two steps which are parallel to one another for attaching a press-in ram and for orienting the cartridge in an angularly correct manner by means of the press-in ram, and a sealing surface, with which the cartridge bears in a sealed manner in the receptacle of the hydraulic block when the cartridge is pressed into the receptacle.

11 Claims, 3 Drawing Sheets

(51) Int. Cl.
*F04C 2/00* (2006.01)
*B60T 13/16* (2006.01)
*F04C 15/00* (2006.01)
*F04C 2/10* (2006.01)
*F04C 2/08* (2006.01)
*F04C 2/14* (2006.01)

(52) U.S. Cl.
CPC ...... *F04C 15/0007* (2013.01); *F04C 15/0026* (2013.01); *F04C 15/0076* (2013.01); *F04C 2240/30* (2013.01)

(58) Field of Classification Search
CPC  F04C 15/0026; F04C 15/007; F04C 15/0076; B60T 13/16
USPC ................. 418/170, 166, 171, 132–133, 102
See application file for complete search history.

(56) References Cited

U.S. PATENT DOCUMENTS

| | | | | |
|---|---|---|---|---|
| 5,064,362 | A | * | 11/1991 | Hansen ................. F04C 15/06 418/15 |
| 5,791,888 | A | | 8/1998 | Smith |
| 6,149,409 | A | * | 11/2000 | Palakodati ............ F01C 21/104 418/133 |
| 2002/0085920 | A1 | | 7/2002 | Staton et al. |

FOREIGN PATENT DOCUMENTS

| | | |
|---|---|---|
| DE | 10 2009 047 626 A1 | 6/2011 |
| JP | 2005-529279 A | 9/2005 |
| JP | 2008-163925 A | 7/2008 |
| JP | 2012-17743 A | 1/2012 |
| JP | 2012-90885 A | 5/2012 |
| WO | 2004/072481 A1 | 8/2004 |

* cited by examiner

INTERNAL GEAR PUMP

This application is a 35 U.S.C. §371 National Stage Application of PCT/EP2014/051474, filed on Jan. 27, 2014, which claims the benefit of priority to Serial No. DE 10 2013 204 072.5, filed on Mar. 11, 2013 in Germany, the disclosures of which are incorporated herein by reference in their entirety.

The disclosure relates to an internal gear pump for a hydraulic vehicle brake system. Internal gear pumps of this kind are used instead of customarily used piston pumps in slip-controlled and/or power-operated vehicle brake systems and often, though not necessarily appropriately, referred to as return pumps.

BACKGROUND

Internal gear pumps are known. They have an annulus and a pinion, which is arranged eccentrically in the annulus and meshes with the annulus in a segment of the circumference. The annuluses are internally toothed gearwheels, while the pinions are externally toothed gearwheels, and the annulus and the pinion can also be taken to be gearwheels of the internal gear pumps. The designations pinion and annulus are used to distinguish them. Opposite the segment of the circumference in which the gearwheels mesh there is a crescent-shaped free space between the annulus and the pinion, and this is referred to here as the pump space. Arranged in the pump space is a divider, on which tooth tips of the two gearwheels rest externally and internally and which divides the pump space into a suction space and a pressure space. Owing to its typical shape, the divider is often also referred to as a crescent or crescent piece. Another name for the divider is filler piece. When driven in rotation, the gearwheels deliver fluid from the suction space into the pressure space. Internal gear pumps without a divider are also known, and these are referred to as toothed ring pumps for the sake of distinguishing them.

German Patent DE 196 13 833 B4 discloses an internal gear pump of this kind having its own housing, by means of which it can be flanged to an electric motor used to drive it, for example. This internal gear pump is not provided for hydraulic vehicle brake systems.

German Laid-Open Application DE 10 2009 047 626 A1 discloses an internal gear pump for a hydraulic vehicle brake system which does not have its own housing but is installed in a hydraulic block of a slip control system of a hydraulic vehicle brake system. The hydraulic block can be taken to be a housing of the internal gear pump.

Such hydraulic blocks are known and they are used for the mechanical fixing and hydraulic interconnection of hydraulic components of a slip control system. Among such components are not only internal gear pumps but also solenoid valves and hydraulic accumulators for the slip control system. The hydraulic block is usually a cuboidal part made of metal, especially aluminum, in which countersunk holes, typically cylindrical and often with a stepped diameter, as sockets for the hydraulic components of the slip control system, and drilled holes, which hydraulically interconnect the sockets and the components installed therein, are made.

SUMMARY

The internal gear pump according to the disclosure is designed as a preassembled module and has a cartridge as a housing, which can be inserted, in particular pressed, into a socket for the internal gear pump, especially in a hydraulic block of a slip control system of a hydraulic vehicle brake system. The cartridge forming the housing of the internal gear pump has a shoulder for angularly correct alignment of the cartridge by means of positive engagement.

By virtue of being designed as a module, the internal gear pump according to the disclosure can be handled as a standard component, simplifying its assembly and, in particular, insertion into the socket. Another advantage of the disclosure is the possibility of testing the serviceability and (pressure-) tightness of the internal gear pump after its preassembly as a module and before it is inserted into the socket. In series production, press-fitting and staking processes, which do not allow removal and reinstallation, are generally used. In the event of a fault, the internal gear pump is scrap. If an internal gear pump has already been installed in a hydraulic block, not only the internal gear pump but also the hydraulic block with the installed hydraulic components as a whole is scrap in the event of a fault.

A cartridge is intended to mean the housing of the internal gear pump, which is designed to correspond on the outside to the socket in such a way that it can be inserted in an accurately fitting manner into the socket.

The shoulder for angularly correct alignment by means of positive engagement can be designed to be like a tool seat for the application of a turning tool, e.g. an open wrench, or like part of a positive coupling, for example. The shoulder can have a polygonal profile or two parallel surfaces, a groove or a ridge, for example. During insertion or pressing into a socket in the internal gear pump, the cartridge is aligned in an angularly correct manner at its shoulder by means of a corresponding press-in ram, for example. The angularly correct alignment ensures, for example, that an eccentric drive gearwheel of the internal gear pump meshes with a driving wheel of an electric motor, which is likewise a gearwheel and is used to drive the internal gear pump, and/or positionally correct alignment of a pump inlet and/or a pump outlet.

The dependent claims relate to advantageous embodiments and developments of the disclosure.

The shoulder on the cartridge in some embodiments is not overlapped by the drive wheel, when viewed axially, allowing the press-in ram or some other tool or some other device for angularly correct alignment of the cartridge to be applied and removed axially to/from the shoulder on the cartridge.

In some embodiments of the disclosure, the cartridge which forms the housing of the internal gear pump has an encircling sealing surface on the circumference. This is a metallic sealing surface or a sealing surface composed of the material from which the cartridge is composed and which provides direct sealing, i.e. without a separate sealing ring, sealing compound or the like by resting on a mating surface of a socket of the internal gear pump, in a hydraulic block for example (claim 6). The sealing surface provides sealing through an interference fit or a taper, for example. This embodiment of the disclosure eliminates a sealing ring or the application of a sealing compound. This embodiment of the disclosure can be implemented independently of the shoulder for angularly correct alignment of the cartridge, i.e. on an internal gear pump, the cartridge of which does not have such a shoulder.

In some embodiments of the disclosure, the sealing surface is narrow, this being intended to mean that it is axially short in relation to the cartridge or to a press-in depth of the cartridge into a socket, e.g. of a hydraulic block. As a result, a frictional movement of the sealing surface on a mating surface of the socket as the cartridge is pressed into the socket is short, thereby ensuring that there is little wear and that the desired sealing is achieved with a high degree of reliability when the cartridge is pressed into the socket.

The internal gear pump according to the disclosure is provided, in particular, as a hydraulic pump for a hydraulic, slip-controlled and/or power-operated vehicle brake system in place of a customarily used piston pump. In slip-controlled vehicle brake systems, hydraulic pumps are also referred to as return pumps.

BRIEF DESCRIPTION OF THE DRAWINGS

The disclosure is explained in greater detail below by means of an embodiment illustrated in the drawing, in which.

DETAILED DESCRIPTION

Figure 1:
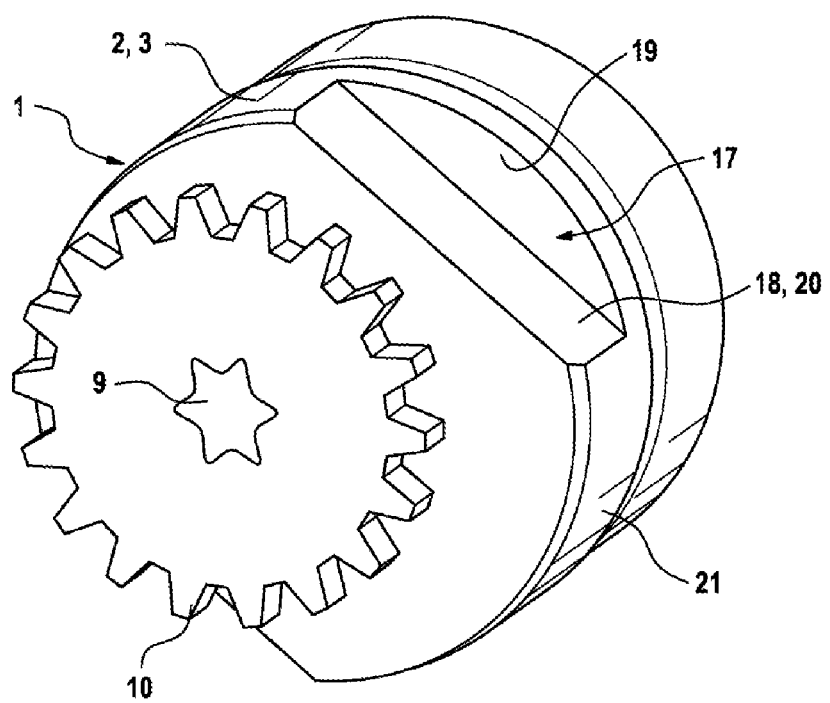
FIG. 1 shows an internal gear pump according to the disclosure in perspective.
Figure 2:
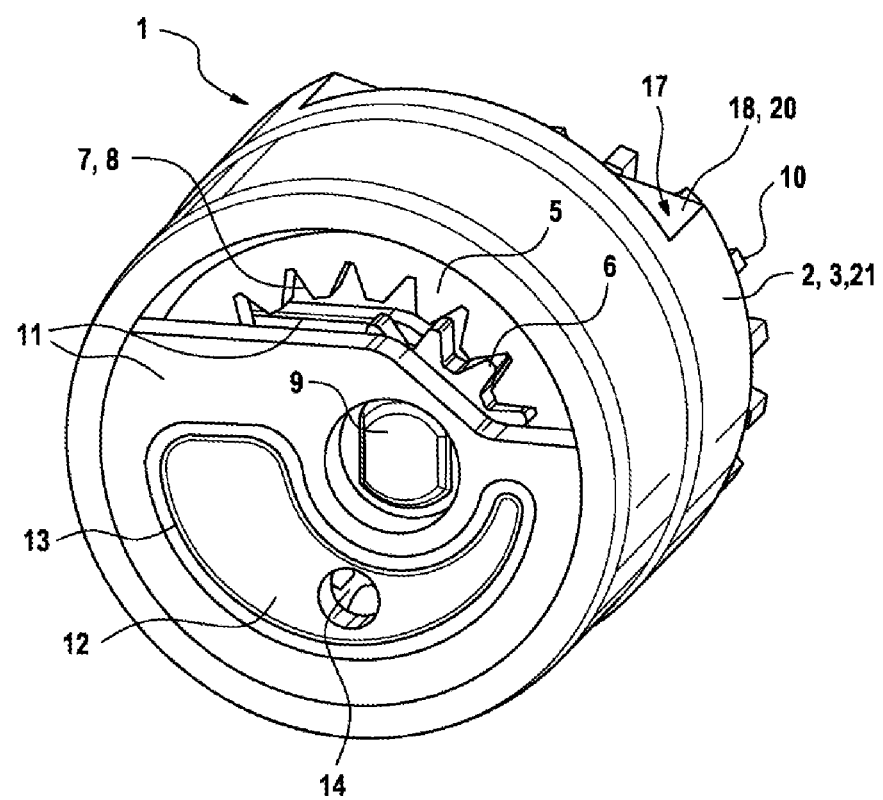
FIG. 2 shows the internal gear pump from FIG. 1 in perspective in the opposite direction of view.

FIGS. 1 and 2 show an internal gear pump 1 according to the disclosure for a hydraulic vehicle brake system. The internal gear pump 1 has a cylindrical housing 2, which is open on one side and is designed as a cartridge 3 for insertion into a socket, which will be explained below.

An annulus 5, which is arranged coaxially in the cartridge 3 and is mounted rotatably therein, and a pinion 6 of the internal gear pump 1, which is arranged eccentrically in the annulus 5 and meshes with the annulus 5, can be seen in an open end of the cartridge 3, said end being visible in FIG. 2. The pinion 6 is an externally toothed gearwheel and the annulus 5 is an internally toothed gearwheel, which are referred to as pinion 6 and annulus 5 for the sake of distinguishing between them. One end of a crescent-shaped free space, here referred to as pump space 7, between the pinion 6 and the annulus 5 can be seen in the open end of the cartridge 3, outside a segment of the circumference in which the pinion 6 meshes with the annulus 5. The visible end of the pump space 7 is a suction space 8, into which the internal gear pump 1 draws brake fluid. A divider arranged in the pump space 7, which divides the pump space 7 into the suction space 8 and a pressure space (not visible) at the other end of the pump space 7, is not visible in the drawing. When driven in rotation, the pinion 6 and the annulus 5 deliver brake fluid from the suction space 8 to the pressure space in a manner known per se.

The pinion 6 is fixed for conjoint rotation on a pump shaft 9, which is passed in a sealed manner through the closed end of the cartridge 3 forming the housing 2 of the internal gear pump 1. As can be seen in FIG. 1, the internal gear pump 1 has a gearwheel as drive wheel 10, which is arranged on the outside on the closed side of the cartridge 3 and is mounted there for conjoint rotation on the pump shaft 9. The pump shaft 9 is coaxial with the pinion 6 and, consequently, the pump shaft 9 is eccentric with respect to the cartridge 3 owing to the eccentric arrangement of the pinion 6 in the annulus 5, with the result that the drive wheel 10 is also eccentric with respect to the cartridge 3, as can be seen in FIG. 1.

Arranged on both sides of the pinion 6, the annulus 5 and of the divider (not visible in the drawing) arranged in the pump space 7 are axial disks 11, which rest on the pinion 6, the annulus 5 and the divider. The axial disks 11 are axially movable and rotationally fixed, cover the pressure space (not visible) and the divider (not visible) and have apertures in the region of the suction space 8. Axial disks 11 of this kind are also referred to as pressure disks or control disks or plates. The axial disks 11 have what are referred to as pressure fields 12 in the outer sides facing away from the pinion 6, the annulus 5 and the divider, said pressure fields being surrounded by a pressure field gasket 13. The pressure fields 12 are flat depressions which extend approximately over the pressure space and the divider, being kidney-shaped in the embodiment depicted. Applying pressure to the pressure fields 12 pushes the axial disks 11 into sealing contact with the pinion 6, the annulus 5 and the divider. The pressure fields 12 have a through hole 14, via which they communicate with the pressure space of the internal gear pump 1. The axial disk 11 facing an observer in FIG. 2 is exposed, i.e. its outer side, which faces away from the pinion 6, the annulus 5 and the divider, is not covered and, in the embodiment, it is approximately flush, in one plane, with the open end of the cartridge 3 which forms the housing 2 of the internal gear pump 1. The pressure field gasket 13 projects somewhat.

The internal gear pump 1 is preassembled as a module in the cartridge 3 which forms the housing 2 of the internal gear pump 1. Owing to preassembly as a module, the internal gear pump 1 can be handled and installed as a standard component and, furthermore, the internal gear pump 1 preassembled as a module can be tested for serviceability and leaktightness before being installed.

Figure 3:
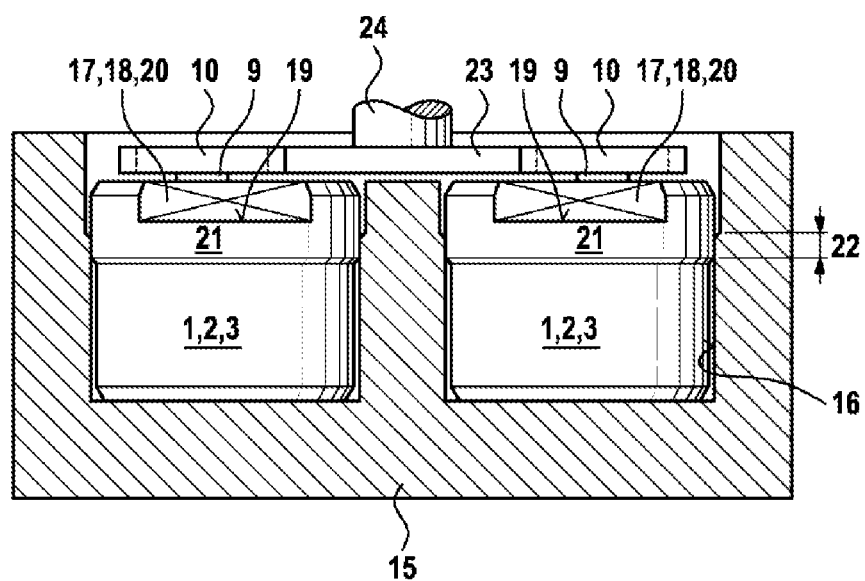
FIG. 3 shows a section through a hydraulic block having two internal gear pumps according to the disclosure.

FIG. 3 shows a section through a hydraulic block 15 of a slip control system (not otherwise shown) of a hydraulic vehicle brake system. The hydraulic block 15 is a block-shaped part made of aluminum, in which countersunk holes are made as sockets 16 for hydraulic components of the slip control system. The hydraulic block 15 has two sockets 16 for two internal gear pumps 1 (illustrated in FIGS. 1 and 2) and further sockets for solenoid valves, hydraulic accumulators and other hydraulic components (not shown) of the slip control system.

The two sockets 16 for the internal gear pumps 1 in the hydraulic block 15 are embodied as cylindrical countersunk holes congruent with the cartridges 3, into which the internal gear pumps 1 can be inserted or pressed, as can be seen in FIG. 3. During insertion, the open side of the cartridge 3 with the exposed axial disk 11 faces a bottom of the sockets 16, and the drive wheels 10 are situated in open sides of the sockets 16 and are therefore accessible, as can be seen in FIG. 3. The exposed axial disk 11 is situated on the bottom of the socket 16 and the pressure field gasket 13 rests sealingly on the bottom of the socket 16. A pressure connection hole and a suction connection hole open at the bottom of the sockets 16 for the internal gear pumps 1. The suction and pressure connection holes are outside the section plane and therefore cannot be seen in the drawing. The pressure connection hole opens into the pressure field 12 of the exposed axial disk 11 in the open side of the cartridge 3 which forms the housing 2 of the internal gear pump 1. Via the through hole 14 in the axial disk 11 and the pressure field 12, the pressure space of the internal gear pumps 1 communicates with the pressure connection hole, which is sealed off by the pressure field gasket 13 together with the pressure field 12.

The suction connection hole opens in the region cut out of the axial disk 11, with the result that the suction connection hole communicates with the suction space 8 of the internal gear pump 1. As a result, a suction and a pressure connection of the internal gear pumps 1 are produced by the insertion or pressing of the internal gear pumps 1 into the sockets 16 in the hydraulic block 15, including the sealing of the connections. The hydraulic block 15 forms a housing for the two internal gear pumps 1 and is here referred to as a surrounding housing to distinguish it from the cartridges 3, which likewise form a housing 2 for the internal gear pumps 1. In the hydraulic block 15 forming the surrounding housing, the two internal gear pumps 1 preassembled as modules are accommodated together with their cartridges 3 forming their housings 2.

On the side on which the drive wheel 10 is situated, the cartridge 3 has two mutually opposite and mutually parallel steps 17. "Treads" of the steps 17 are mutually parallel surfaces in secant planes of the cartridge 3, which are also axially parallel planes of the cartridge 3. They are referred to below as parallel surfaces 18. "Risers" of the steps 17 are situated in a radial plane of the cartridge 3 and are referred to below as radial surfaces 19. The parallel surfaces 18 form a shoulder 20 for angularly correct alignment of the cartridge 3 by means of a corresponding press-in ram (not shown), which is applied to the radial surfaces 19 to press in the cartridge 3 and has a free space for the drive wheel 10. A diameter of the drive wheel 10 is less than a distance between the parallel surfaces 18, ensuring that the drive wheel 10 does not overlap the steps 17 and that the press-in ram (not shown) can be applied to the steps 17.

The cylindrical cartridge 3 which forms the housing 2 of the internal gear pump 1 has a somewhat larger diameter on the side on which the drive wheel 10 is situated than on the opposite side. In other words: on the side of the drive wheel 10, the cylindrical cartridge 3 has an oversize. In this way, a cylindrical encircling sealing surface 21 is formed, extending a short distance beyond the steps 17 in an axial direction.

At their mouths, the sockets 16 have an oversize which extends somewhat deeper than the steps 17 of the cartridges 3 (see FIG. 3). Adjoining this, as far as a bottom of the sockets 16, the sockets 16 have an undersize in relation to the sealing surfaces 21 of the cartridges 3. In the region of an overlap 22 between the smaller diameter of the sockets 16 and the sealing surfaces 21 of the cartridges 3, there is therefore an interference fit, with the result that the sealing surfaces 21 rest directly and with the interference fit on the circumference of the sockets 16 in the region of the overlap 22 and seal off the cartridges 3 in the sockets 16 of the hydraulic block 15. The overlap 22 forms an axially short sealing region of the cartridges 3 in the sockets 16 of the hydraulic block 15. In the region of the overlap 22, the circumference of the sockets 16 can also be taken to be a mating surface for the sealing surfaces 21 of the cartridges 3.

During press-fitting, the cartridges 3 are aligned with the press-in ram (not shown), which is applied to the parallel steps 17, in such a way that the drive wheels of the two internal gear pumps 1 mesh with a gearwheel arranged between them, which is referred to as driving wheel 23 and which is depicted in FIG. 3 in order to illustrate its position. The driving wheel is seated for conjoint rotation on a motor or transmission output shaft 24 of an electric motor (not shown) or of a transmission flanged to the electric motor. The electric motor with the transmission is mounted on the hydraulic block 15 after the press-fitting of the internal gear pumps 1. The angular alignment of the cartridges 3 of the internal gear pumps 1 ensures that the suction connection hole at the bottom of the sockets 16 for the internal gear pumps 1 in the hydraulic block 15 communicates with the suction space 8 of the internal gear pumps 1 and that the pressure connection hole communicates with the pressure field 12.

In the embodiment, the drive wheels 10 of the internal gear pumps 1 are at a distance from one another when the cartridges 3 that form the housings 2 of the internal gear pumps 1 are aligned at the correct angle. This ensures that the drive wheels 10 cannot disengage from the driving wheel 23 through rotation of the cartridges 3 in the sockets 16 of the hydraulic block 15.

The invention claimed is:

1. An internal gear pump for a hydraulic vehicle brake system, comprising:
   a cartridge in which gears of the internal gear pump are housed, the cartridge formed as a preassembled module and including a shoulder configured for angular alignment of the cartridge during installation of the cartridge; and
   a drive wheel positioned on one end of the cartridge, a diameter of the drive wheel being smaller than a diameter of the cartridge, wherein the drive wheel does not overlap the shoulder when viewed axially.

2. The internal gear pump as claimed in claim 1, further comprising a pump shaft that is eccentric with respect to the cartridge.

3. The internal gear pump as claimed in claim 1, the cartridge having an encircling sealing surface on an outer circumference of the cartridge, the encircling sealing surface configured to seal the cartridge in a socket.

4. The internal gear pump as claimed in claim 3, wherein the sealing surface is narrow.

5. The internal gear pump as claimed in claim 1, wherein the cartridge has a circular cross section.

6. The internal gear pump as claimed in claim 1, wherein the cartridge includes two parallel surfaces extending in secant directions so as to form the shoulder.

7. The internal gear pump as claimed in claim 6, wherein:
   the two parallel surfaces are formed as part of two mutually opposite parallel steps which are parallel with respect to a longitudinal axis of the cartridge, and
   each of the two mutually opposite parallel steps further includes a radial surface situated in a radial plane of the cartridge defined perpendicular to the longitudinal axis and which are configured for pressing the cartridge into a socket.

8. An internal gear pump for a hydraulic vehicle brake system, comprising:
   a cartridge in which gears of the internal gear pump are housed, the cartridge formed as a preassembled module and including a shoulder configured for angular alignment of the cartridge during installation of the cartridge,
   wherein the cartridge includes two parallel surfaces extending in secant directions so as to form the shoulder.

9. The internal gear pump as claimed in claim 8, wherein:
   the two parallel surfaces are formed as part of two mutually opposite parallel steps which are parallel with respect to a longitudinal axis of the cartridge, and
   each of the two mutually opposite parallel steps further includes a radial surface situated in a radial plane of the cartridge defined perpendicular to the longitudinal axis and which are configured for pressing the cartridge into a socket.

10. The internal gear pump as claimed in claim 8, further comprising a pump shaft that is eccentric with respect to the cartridge.

11. The internal gear pump as claimed in claim 8, the cartridge having an encircling sealing surface on an outer circumference of the cartridge, the encircling sealing surface configured to seal the cartridge in a socket.

* * * * *